Oct. 19, 1926.  
W. W. HOLLAND  
REFLUX COLUMN  
Filed May 12, 1924
1,603,772
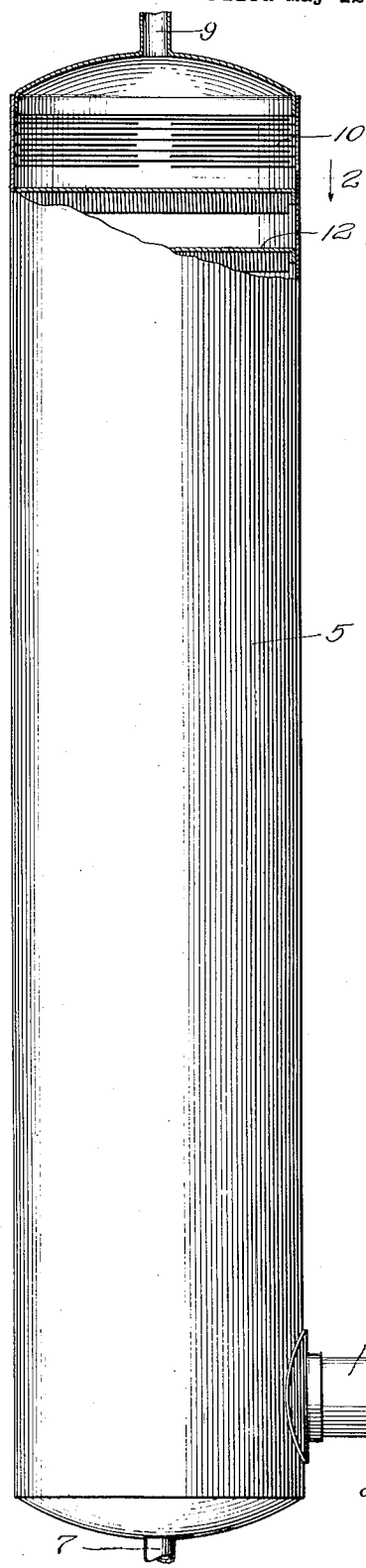
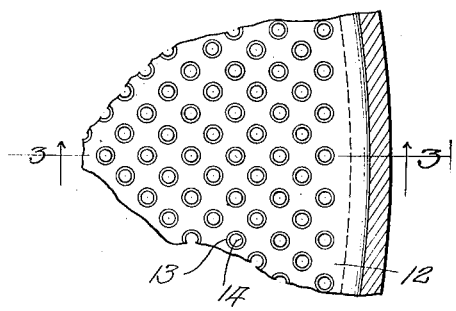
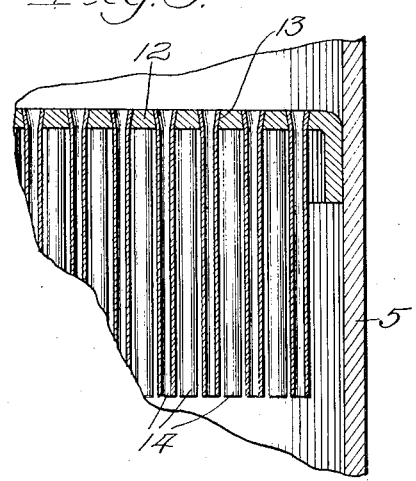
Inventor:
William W. Holland Patented Oct. 19, 1926.

1,603,772

UNITED STATES PATENT OFFICE.

WILLIAM W. HOLLAND, OF ALTON, ILLINOIS, ASSIGNOR TO STANDARD OIL COMPANY, OF WHITING, INDIANA, A CORPORATION OF INDIANA.

REFLUX COLUMN.

Application filed May 12, 1924. Serial No. 712,566.

The present invention relates to improvements in fractionating columns, and more particularly to reflux fractionating columns intended for use in connection with the distillation of materials such as petroleum and its various refinery fractions or cuts.

The invention will be clearly understood from the following description, illustrated by the accompanying drawings, in which:

Figure 1 is a side elevation, partly in section, showing a column or tower embodying the present invention;

Fig. 2 is a broken sectional view on the line 2 of Fig. 1; and

Fig. 3 is a broken sectional view on the line 3—3 of Fig. 2.

Referring more particularly to the drawings, the numeral 5 indicates a vertical shell, preferably of cylindrical form, having near its lower end a vapor inlet 6 from a still (not shown) in which the material to be distilled is heated. At the bottom of the tower 5 a discharge line 7 is provided, which may suitably return reflux formed in the column to said still. Vapors uncondensed in the top of the tower pass out through a vapor line 9, for example, to a suitable condenser (not shown).

Just below the vapor outlet 9 a plurality of baffle plates 10 are provided, which prevent entrainment of reflux or condensate by the vapors passing out of the column. These baffle plates 10 may be of any desired form, those illustrated being of the doughnut and disk type.

Between the opening of the inlet pipe 6 and the separator or baffle plates 10, the tower 5 is divided transversely by numerous spaced plates 12, portions of which are shown on an enlarged scale in Fig. 2 in plan and in Fig. 3 in section. Each of the spaced plates 12 is provided with a large number of small openings 13, in each of which is supported a depending tube 14. The upper ends of the tubes 14 do not extend appreciably above the upper surface of the plates 12, being preferably flush therewith or slightly therebelow. The tubes 14 depend freely for a considerable proportion of the space between each plate and that below it; for example, from one-fourth to three-fourths of the space between plates.

The tubes are preferably not over three-fourths inch in internal diameter, smaller tubes being in general preferred.

To illustrate a specific embodiment of this invention, it may be noted that in a twenty foot column four feet in diameter, it has been found satisfactory to space the plates 12 inches apart and to provide for each plate thirty-five hundred to thirty-six hundred one-fourth inch tubes, substantially equally spaced from each other, and depending approximately 5 inches below the surface of the supporting plate. These proportions are given for the purpose of illustration, and may be varied widely within the limits hereinbefore set forth, and as stated in the following claims.

It is preferred that all of the transverse plates of the column be provided with depending tubes in the manner herein described. It is readily apparent, however, that other types of fractionating plates may be employed in the lower or intermediate portions of the tower.

In the operation of the tower, the tubes 14 provide the sole passages for the ascending vapors and descending condensates. In travelling through these tubes, descending condensate is broken into extremely fine droplets and films and is caused to provide an extensive and intimate contact surface with the ascending vapors. There is likewise an extensive indirect heat-conductive relationship between the vapors which surround and eddy about the exterior of the tubes and the reflux descending therethrough, which further improves the heat transfer between vapors and liquids within the column.

In practice, it has been found that the fractionating column of the present invention is exceedingly efficient in separating desired light products from heavier products contained in the vapors passing there through. For example, with this column, separations of gasoline having a predetermined end point have been made from crude oils, pressure distillates, steam still stocks and the like equal to and exceeding in proportion the theoretical proportions calculated on the basis of the distillation curves of the stock distilled.

I claim:

1. In a reflux fractionating column having a vertical columnar vapor passage, a plurality of spaced plates, and spaced open tubes extending from the upper surfaces of said plates downwardly freely for a substantial proportion of the spaces between the plates, said spaces communicating solely through said open tubes.

2. In a reflux fractionating column having a vertical columnar vapor space, a plurality of spaced transverse plates, and a plurality of small open tubes depending freely from the upper surfaces of said plates into the spaces therebetween, said spaces communcating solely through said open tubes.

3. In a reflux fractionating column having a vertical columnar vapor passage, a plurality of spaced transverse plates, a plurality of open tubes of less than three-fourths inch internal diameter extending downwardly freely from the upper surfaces of said plates for at least one-fourth of the distance between plates, the spaces between the plates communicating solely through said open tubes.

WILLIAM W. HOLLAND.